United States Patent
Dickenson et al.

(10) Patent No.: US 10,616,037 B2
(45) Date of Patent: Apr. 7, 2020

(54) DEVICES DEMISE ACTIONS AND NOTIFICATION

(71) Applicant: International Business Machines Corporation, Armonk, NY (US)

(72) Inventors: Marc A. Dickenson, Austin, TX (US); Rahul Gupta, Austin, TX (US); Timothy J. Hahn, Cary, NC (US); Harrison Kurtz, Austin, TX (US); Hari H. Madduri, Austin, TX (US); Michael P. Robertson, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 83 days.

(21) Appl. No.: 15/495,980

(22) Filed: Apr. 25, 2017

(65) Prior Publication Data

US 2018/0309614 A1    Oct. 25, 2018

(51) Int. Cl.
*H04L 12/24* (2006.01)
*H04L 29/08* (2006.01)

(52) U.S. Cl.
CPC ........ *H04L 41/046* (2013.01); *H04L 41/0803* (2013.01); *H04L 67/12* (2013.01); *H04L 67/2861* (2013.01)

(58) Field of Classification Search
CPC . H04L 41/0654; H04L 67/28; H04L 67/2861; H04L 69/40
USPC .................................................... 709/202
See application file for complete search history.

(56) References Cited

U.S. PATENT DOCUMENTS

| | | | |
|---|---|---|---|
| 7,194,543 B2 | 3/2007 | Robertson et al. | |
| 9,110,848 B1* | 8/2015 | Kim | G06F 11/0709 |
| 9,753,797 B1* | 9/2017 | Higgins | G06F 11/0772 |
| 2003/0079078 A1* | 4/2003 | Zipprich | G06F 21/80 |
| | | | 711/112 |
| 2003/0144894 A1* | 7/2003 | Robertson | G06Q 10/06 |
| | | | 709/226 |
| 2004/0187152 A1* | 9/2004 | Francis | H04L 12/2803 |
| | | | 725/58 |
| 2005/0193249 A1* | 9/2005 | Poustchi | H04M 7/006 |
| | | | 714/13 |
| 2006/0047666 A1 | 3/2006 | Bedi et al. | |
| 2014/0016455 A1* | 1/2014 | Ruetschi | H04L 67/2861 |
| | | | 370/220 |
| 2014/0280792 A1* | 9/2014 | Sigoure | H04L 67/28 |
| | | | 709/220 |
| 2015/0120863 A1* | 4/2015 | Wu | H04L 67/28 |
| | | | 709/217 |
| 2016/0197934 A1 | 7/2016 | Muraoka et al. | |

\* cited by examiner

*Primary Examiner* — Chris Parry
*Assistant Examiner* — Adam A Cooney
(74) *Attorney, Agent, or Firm* — North Shore Patents, P.C.; Michele Liu Baillie (57) ABSTRACT

In a method for device unavailability management within a network, a network device selects an advocate device as an agent of the network device. The network device defines a set of actions to be executed when the network device ever becomes unavailable. The set of actions is stored in a datastore and associated with the network device. Upon determining that the network device has become unavailable, the advocate device is notified and obtains the set of actions associated with the network device. The advocate device then executes the set of actions by the advocate device.

14 Claims, 5 Drawing Sheets

DEVICES DEMISE ACTIONS AND NOTIFICATION

BACKGROUND

Networked devices, such as Internet of Things (IoT) devices, are being more commonplace. IoT refers to the interconnection via the Internet of computing devices, embedded with electronics, software, sensors, etc., and network connectivity, that enable the computing devices to collect and exchange data. When an IoT device becomes unavailable or "dies", determining how and when the demise formalities will be triggered and handled is not addressed. This is a problem particularly when the IoT device that has died was configured with roles or functions that must be serviced even after the IoT device's death. Furthermore, security for IoT devices is a growing concern. For example, when a IoT device dies, a bad actor may attempt to impersonate this device.

SUMMARY

Disclosed herein is a method for device unavailability management within a network and a computer program product and a system as specified in the independent claims. Embodiments of the present invention are given in the dependent claims. Embodiments of the present invention can be freely combined with each other if they are not mutually exclusive.

According to an embodiment of the present invention, a method for device unavailability management within a network includes: selecting, by a network device, an advocate device as an agent of the network device; storing in a datastore a set of actions associated with the network device to be executed when the network device becomes unavailable; determining that the network device has become unavailable; upon determining that the network device has become unavailable, obtaining the set of actions associated with the network device by the advocate device; and executing the set of actions by the advocate device.

In one aspect of the present invention, the set of actions comprises sending a tombstone message by the advocate device in response to a request addressed to the network device after the network device becomes unavailable.

In one aspect of the present invention, the set of actions comprises a reassignment of a role of the network device in the network, where the advocate device configures another network device to assume the role of the network device in the network.

In one aspect of the present invention, the set of actions comprises instructions for disposition of data held by the network device at the time the network device becomes unavailable, where the advocate device disposes of the data held by the network device at the time the network device becomes unavailable according to the instructions.

In one aspect of the present invention, the set of actions comprises instructions for disposition of debts or liabilities held by the network device at the time the network device becomes unavailable, where the advocate device disposes of the debts or liabilities held by the network device at the time the network device becomes unavailable according to the instructions.

DETAILED DESCRIPTION

Figure 1:
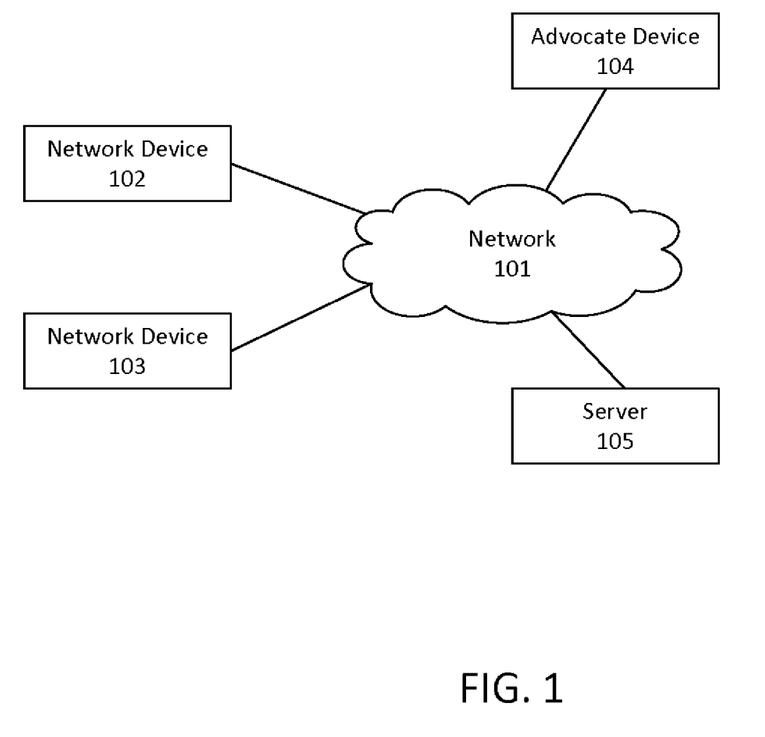
FIG. 1 illustrates an exemplary embodiment of a system for device unavailability management within a network.

FIG. 1 illustrates an exemplary embodiment of a system for device unavailability management within a network. The system includes the network 101, which may be an Internet of Things (IoT) network. Within the network are network devices 102-103, which may be part of the IoT network and provided IoT services over the network 101. Also within the network 101 is one or more advocate devices 104 and possibly a server 105. The functions of the network devices 102-103, the advocate device 104, and the server 105 in device unavailability management are described below.

Figure 2:
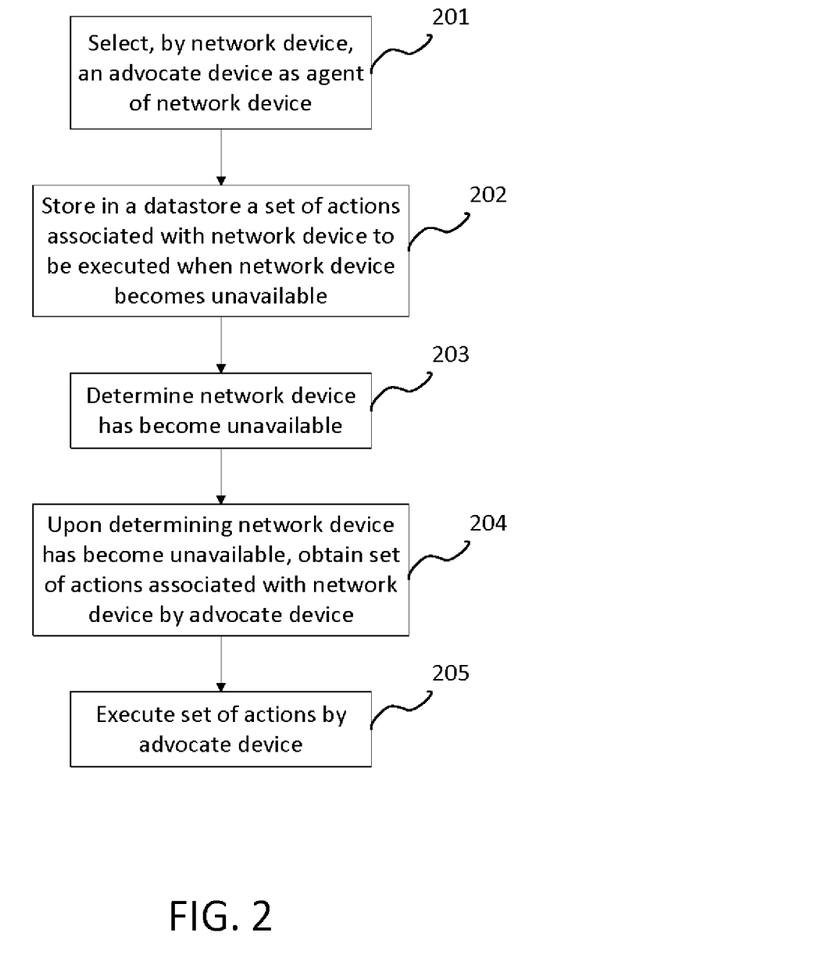
FIG. 2 illustrates an exemplary embodiment of a method for device unavailability management within a network.

FIG. 2 illustrates an exemplary embodiment of a method for device unavailability management within a network. A network device 102 first selects an advocate device 104 as an agent of the network device 102 (201). A set of actions associated with the network device 102 is then stored in a datastore, where the set of actions are to be executed when the network device 102 become unavailable (202). The set of actions may be defined by the network device 102 and specifically for the network device 102. In this exemplary embodiment, the advocate device 104 may be an application, a process, or piece of code executed by a computing device to perform the role of the agent. By selecting the advocate device 104, the network device 102 creates a secure pairing with the advocate device 104. The set of actions may be stored by the advocate device 104 itself or by another network device 103. Assume that the network device 102 is determined at some point to have become unavailable (203). Upon determining that the network device 102 has become unavailable, the set of actions associated with the network device 102 is obtained by the advocate device 104 (204). When the set of actions are stored by another network device 103, the advocate device 104 queries the other network device 103 for the set of actions associated with the network device 102. The set of actions are then executed by the advocate device 104 (205).

Figure 3:
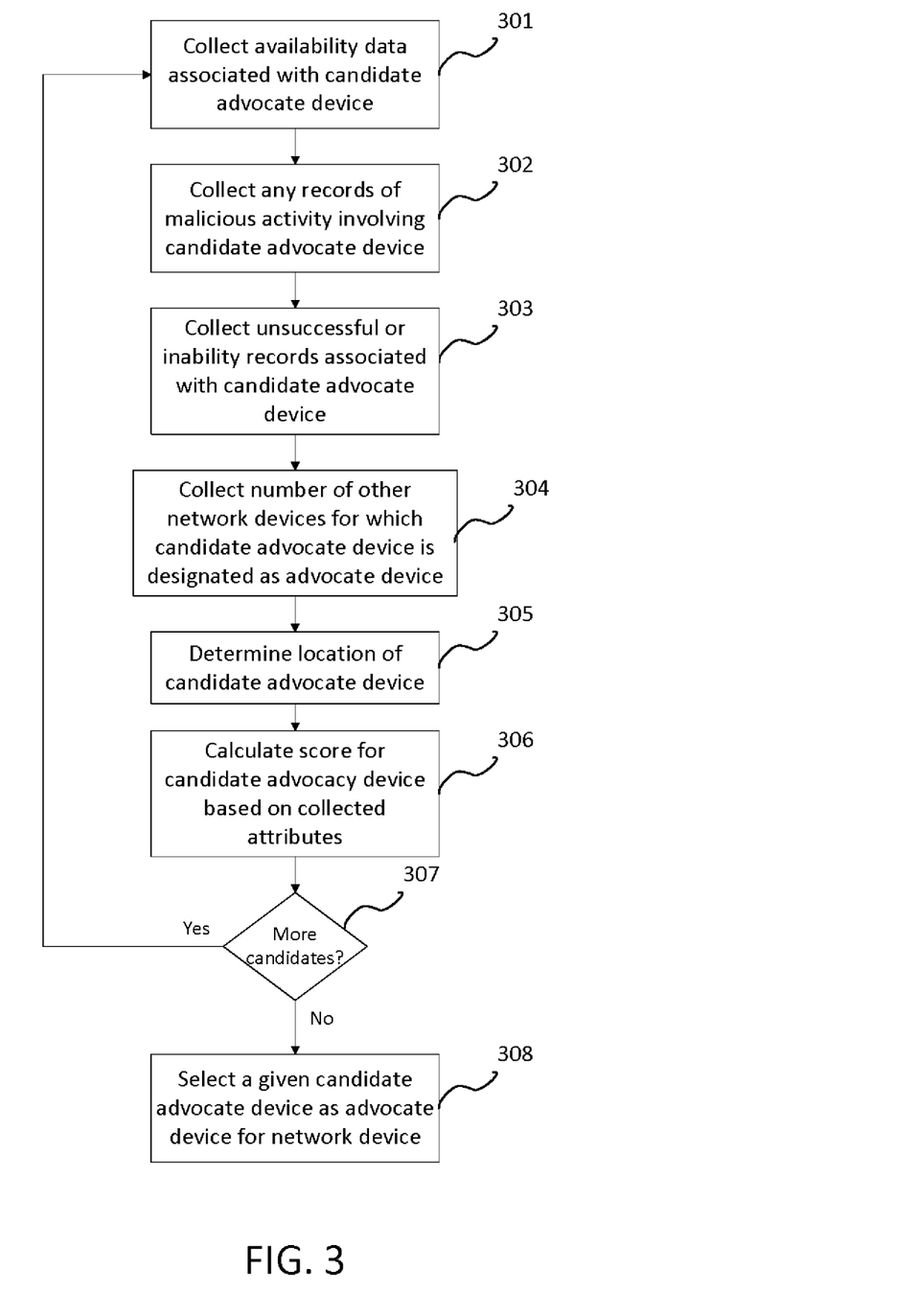
FIG. 3 illustrates an exemplary embodiment of the selection of an advocate device for a network device.

FIG. 3 illustrates an exemplary embodiment of the selection of an advocate device for a network device. To select an advocate device, the network device 102 collects one or more attributes for each candidate advocate device within the network 101. Alternatively, the attributes may be collected by another device(s) acting on behalf of the network device 102. A candidate advocate device may be any device within the network 101 capability of functioning as an advocate device 104. In this exemplary embodiment, the network device 102 collects availability data associated with the candidate advocate device (301). Availability data may comprise time series data indicating the level of outages experienced by the candidate advocate device. The network device 102 further collects any records of malicious activity involving the candidate advocate device (302), and any records of unsuccessful or inability records associated with the candidate advocate device (303) (i.e., records of situations where the candidate advocate device is unable to execute the set of actions for another network device). The network device 102 further collects the number of other network devices for which the candidate advocate device is designated as advocate device (304) and determines the location of the candidate advocate device (305). The network device 102 then calculates a score for the candidate advocacy device based on the collected attributes (306). The score may be calculated based on a formula, configurable by the network device 102. The score may be calculated as a composite score, where individual scores for each attribute are combined according to a formula. The individual attributes and/or individual scores may be weighted according to priorities as configured by the network device 102 or a network administrator. If multiple candidate advocate devices are considered (307), then the network device 102 repeats steps 301-306 for each candidate advocate device. The network device 102 then selects a given candidate advocate device as the advocate device 104 for the network device 102 (308).

The network device 102 may define the set of actions that is stored by the advocate device 104 or by another network device 104. In addition, the network device 102 may further define the criteria for determining when it is to deemed "unavailable". Example criteria include length of time since last message from the network device 102 and number messages sent without a responsive. Alternatively, the criteria may be configured based on network policies based on the type or the role of the network device 102. The criteria for the network device 102 may also be configured by another network device 104. In one exemplary embodiment, when the demise of the network device 102 cannot be definitively determined, then a consensus among a set of observer nodes or devices can be used to declare the network device 102 to be "unavailable". The determination of whether the network device 102 is unavailable may be performed by the advocate device 104, the server 105, or another network device 103. When the determination is made by an entity other than the advocate device 104, the advocate device 104 would receive a notification that the network device 102 has become unavailable. Upon receiving this notification, the advocate device 104 obtains and executes the set of actions associated with the network device 102.

In an exemplary embodiment, a server 105 may store the set of actions associated with the network device 102 in an audit log secured by a two-part authentication key. The server 105 stores the first part of the key, and the advocate device 104 stores the second part of the key. When the network device 102 is determined to be unavailable by the server 105, the server 105 publishes the first part of the key to the advocate device 104. The advocate device 104 obtains the set of actions from the secure audit log using the first and second parts of the key. In this way, the advocate device 104 can be authenticated prior to being given access to the log. The two-part key can also be used to prevent unauthorized changes to the set of actions, either prior to or after the network device 102 becomes unavailable.

Figure 4:
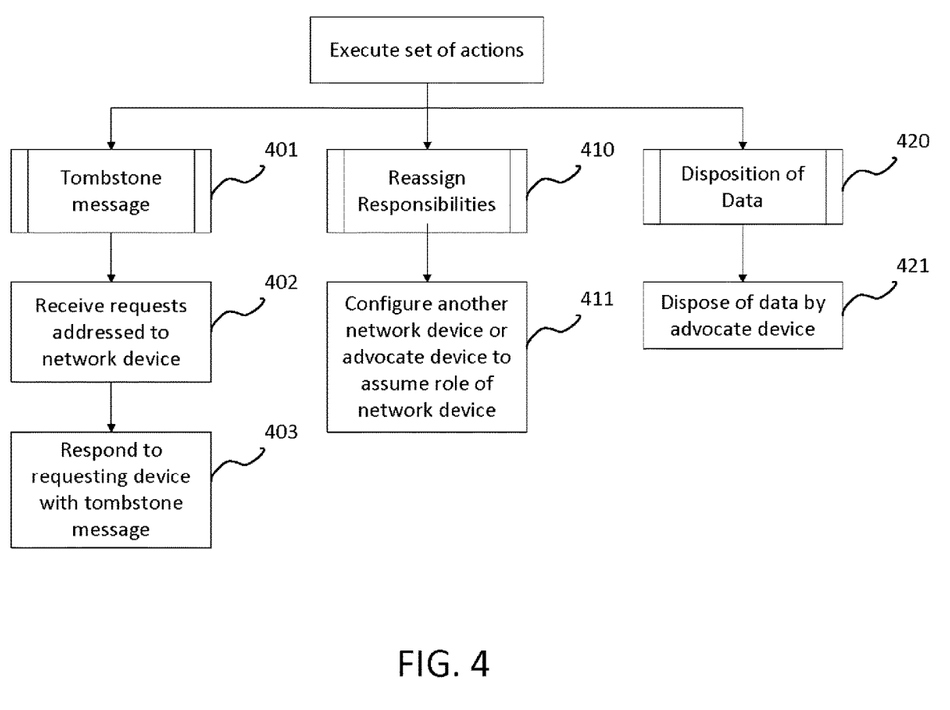
FIG. 4 illustrates an exemplary embodiment of exemplary set of actions executable by an advocate device.

FIG. 4 illustrates an exemplary embodiment of exemplary set of actions executable by an advocate device. In one exemplary embodiment, the set of actions defined by the network device 102 includes a tombstone message (401). After the network device 102 becomes unavailable, requests addressed to the network device 102 is directed to the advocate device 104 (402). The advocate device 104 responds with the tombstone message, which informs the requesting device of the network device's 102 unavailability (403). The tombstone message can help with identifying devices that seek to impersonate the unavailable network device 102. For example, a requesting device can maintain a list of network devices for which it has received a tombstone message. If the requesting device subsequently receives a message from a network device on the list, then the message can be flagged as potentially fraudulent. The tombstone message can also be configured to be sent to the server 105 upon the demise of the network device 102 and to include data about the network device 102 and/or the work done by the network device 102. Here, the tombstone message serves as a historical record, which may be stored with other historical records from other unavailable network devices.

In another exemplary embodiment, the set of actions can include reassigning the responsibilities of the unavailable network device 102 to another device (410). Upon determining that the network device 102 is unavailable, the advocate device 104 configures another network device, either network device 103 or some other device (not shown) in the network, to assume the role of the network device 102 (411). Alternatively, the set of actions can specify that the advocate device 104 itself assumes the role of the network device 102.

In another exemplary embodiment, the set of actions can include instructions for the disposition of data held by the network device 102 at the time of its demise (420). Upon determining that the network device 102 is unavailable, the advocate device 104 disposes of the data in a manner indicated by the network device 102 (421). For example, the network device 102 may have held Client IDs, DNS records, IP addresses, logs, files, and other data. The set of actions can include instructions to dispose of this data based on network policies or as specifically configured for the network device 102. Disposition may include a data dump to a predetermined storage location or log.

In another exemplary embodiment, the set of actions can include instructions for the disposition of financial debt or liabilities managed by the network device 102 at the time of its demise. For example, when the role of the network device 102 includes allocations of funds in an account to pay for services or includes the collections of funds, the set of actions can include instructions for the advocate device 104 to facilitate payment of any outstanding debts or liabilities existing at the time of the network device's 102 demise using the funds in the account, assume the role of the network device 102 in collecting any outstanding funds due, and/or to distribute any funds remaining in the account after settlement of the debts and liabilities managed by the network device 102.

In the above described manner, the security for network devices, particularly IoT devices, are addressed through the end-of-lifecycle stages of the network devices. Security is addressed by establishing a secure advocate device, which uses the set of actions defined by the network device to announce, advocate, and execute for the network device after it become unavailable. The set of actions thus function as the network device's "last will and testament" that is executed by the advocate device. Through the execution of the set of actions, any debts or liabilities held by the network device may be settled, the role of the network device in the network at the time of its demise may be reassigned, and any data held by the network device at the time of its demise may be obtained and stored. A tombstone message may also be sent as part of the set of actions and used to capture historical data concerning the network device.

Figure 5:
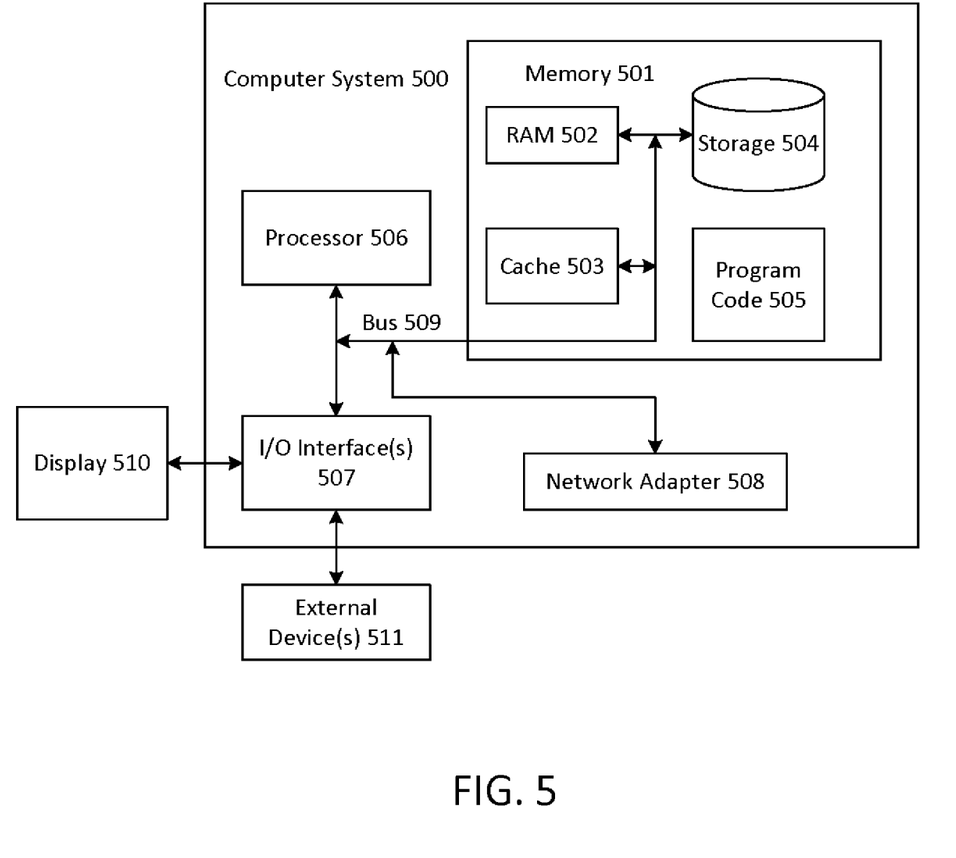
FIG. 5 illustrates a computing system, one or more of which may implement the exemplary embodiments of the present invention.

FIG. 5 illustrates a computing system, one or more of which may implement the exemplary embodiments of the present invention. The computing system 500 is operationally coupled to a processor or processing units 506, a memory 501, and a bus 509 that couples various system components, including the memory 501 to the processor 506. The bus 509 represents one or more of any of several types of bus structure, including a memory bus or memory controller, a peripheral bus, an accelerated graphics port, and a processor or local bus using any of a variety of bus architectures. The memory 501 may include computer readable media in the form of volatile memory, such as random access memory (RAM) 502 or cache memory 503, or non-volatile storage media 504. The memory 501 may include at least one program product having a set of at least one program code module 505 that are configured to carry out the functions of embodiment of the present invention when executed by the processor 506. The computer system 500 may also communicate with one or more external devices 511, such as a display 510, via I/O interfaces 507. The computer system 500 may communicate with one or more networks via network adapter 508.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for device unavailability management within an internet of things network, comprising:
    prior to a first network device becoming unavailable, selecting, by the first network device, an advocate device to be an agent of the first network device after the first network device becomes unavailable, the first network device and the advocate device each being an internet of things device in the internet of things network;
    storing in a datastore, by a second network device, a set of actions associated with the first network device to be executed after the first network device becomes unavailable;
    determining, by the advocate device, that the first network device has become unavailable;
    after determining that the first network device has become unavailable, obtaining, by the advocate device, the set of actions associated with the first network device from the second network device; and
    executing the set of actions by the advocate device, comprising:
        disposing, by the advocate device, of any financial debt or liabilities managed by the first network device at a time the first network device became unavailable;
        configuring, by the advocate device, another internet of things device in the internet of things network to assume a role of the first network device in the internet of things network; and
        disposing, by the advocate device, of any data held by the first network device at the time the first network device became unavailable.

2. The method of claim 1, further comprising:
    configuring, by the first network device, the set of actions prior to the first network device becoming unavailable.

3. The method of claim 1, wherein the set of actions further comprises sending a tombstone message, wherein the executing of the set of actions further comprises:
    receiving, by the advocate device from a requesting device, a request addressed to the first network device after the first network device has become unavailable; and
    in response, sending the tombstone message, by the advocate device to the requesting device, as a response to the request.

4. The method of claim 3, wherein the tombstone message comprises data about the first network device and work done by the first network device, wherein the method further comprises:
    storing the tombstone message as a historical record for the first network device.

5. The method of claim 1, wherein the second network device is the advocate device,
    wherein the storing of the set of actions comprises storing the set of actions in the datastore by the advocate device,
    wherein the obtaining of the set of actions comprises retrieving the set of actions from the datastore by the advocate device.

6. The method of claim 1, wherein the second network device is not the advocate device, wherein after determining that the first network device has become unavailable, the obtaining of the set of actions comprises:
    querying, by the advocate device, the second network device for the set of actions associated with the first network device; and
    receiving, by the advocate device, the set of actions associated with the first network device as a response to the query.

7. The method of claim 1, wherein the determining that the first network device has become unavailable comprises:
    determining, by a third network device, that the first network device has become unavailable; and
    receiving a notification, by the advocate device from the third network device, that the first network device has become unavailable.

8. A computer program product for device unavailability management within an internet of things network, the computer program product comprising one or more computer readable storage media having program instructions embodied therewith, the program instructions executable by one or more processors to cause the one or more processors to:
    prior to a first network device becoming unavailable, select, by the first network device, an advocate device to be an agent of the first network device after the first network device becomes unavailable, the first network device and the advocate device each being an internet of things device in the internet of things network;
    store in a datastore, by a second network device, a set of actions associated with the network device to be executed after the first network device becomes unavailable;
    determine, by the advocate device, that the first network device has become unavailable;
    after determining that the first network device has become unavailable, obtain, by the advocate device, the set of actions associated with the first network device from the second network device; and
    execute the set of actions by the advocate device, comprising:
        dispose, by the advocate device, of any financial debt or liabilities managed by the first network device at a time the first network device became unavailable;
        configure, by the advocate device, another internet of things device in the internet of things network to assume a role of the first network device in the internet of things network; and dispose, by the advocate device, of any data held by the first network device at the time the first network device became unavailable.

9. The computer program product of claim 8, wherein the one or more processors are further caused to:
configure, by the first network device, the set of actions prior to the first network device becoming unavailable.

10. The computer program product of claim 8, wherein the set of actions further comprises sending a tombstone message, wherein the executing of the set of actions further comprises:
receive, by the advocate device from a requesting device, a request addressed to the first network device after the first network device has become unavailable; and
in response, send the tombstone message, by the advocate device to the requesting device, as a response to the request.

11. The computer program product of claim 10, wherein the tombstone message comprises data about the first network device and work done by the first network device, wherein the one or more processors are further caused to:
store the tombstone message as a historical record for the first network device.

12. A system, comprising:
one or more processors; and
one or more computer readable storage media having program instructions embodied therewith, the program instructions executable by one or more processors to cause the one or more processors to:
prior to a first network device becoming unavailable, select, by the first network device, an advocate device to be an agent of the first network device after the first network device becomes unavailable, the first network device and the advocate device each being an internet of things device in an internet of things network;
store in a datastore, by a second network device, a set of actions associated with the network device to be executed after the first network device becomes unavailable;
determine, by the advocate device, that the first network device has become unavailable;
after determining that the first network device has become unavailable, obtain, by the advocate device, the set of actions associated with the first network device by the second network device; and
execute the set of actions by the advocate device, comprising:
dispose, by the advocate device, of any financial debt or liabilities managed by the first network device at a time the first network device became unavailable;
configure, by the advocate device, another internet of things device in the internet of things network to assume a role of the first network device in the internet of things network; and
dispose, by the advocate device, of any data held by the first network device at the time the first network device became unavailable.

13. The system of claim 12, wherein the one or more processors are further caused to:
configure, by the first network device, the set of actions prior to the first network device becoming unavailable.

14. The system of claim 12, wherein the set of actions further comprises sending a tombstone message, wherein the executing of the set of actions further comprises:
receive, by the advocate device from a requesting device, a request addressed to the first network device after the first network device has become unavailable; and
in response, send the tombstone message, by the advocate device to the requesting device, as a response to the request.

* * * * *